Nov. 12, 1963  R. J. ROMAN  3,110,194
CAM AND FOLLOWER
Filed Feb. 20, 1962  2 Sheets-Sheet 1
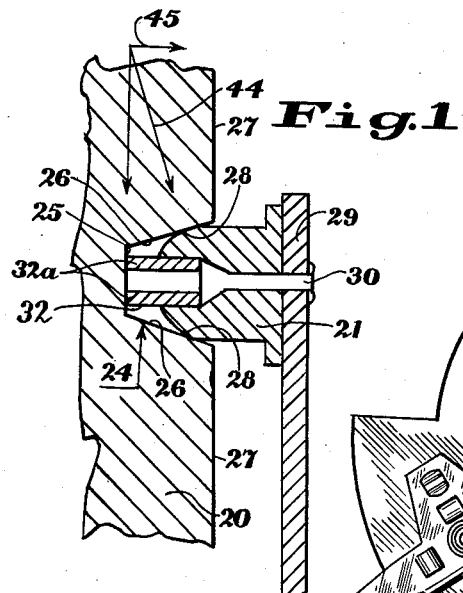
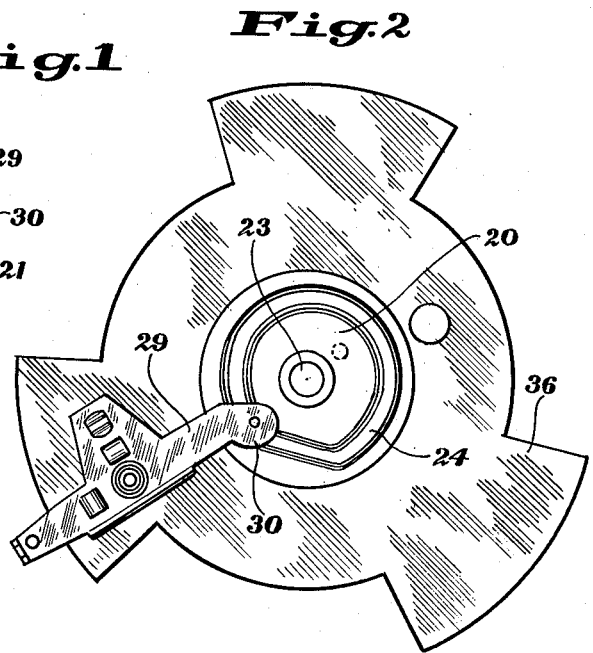
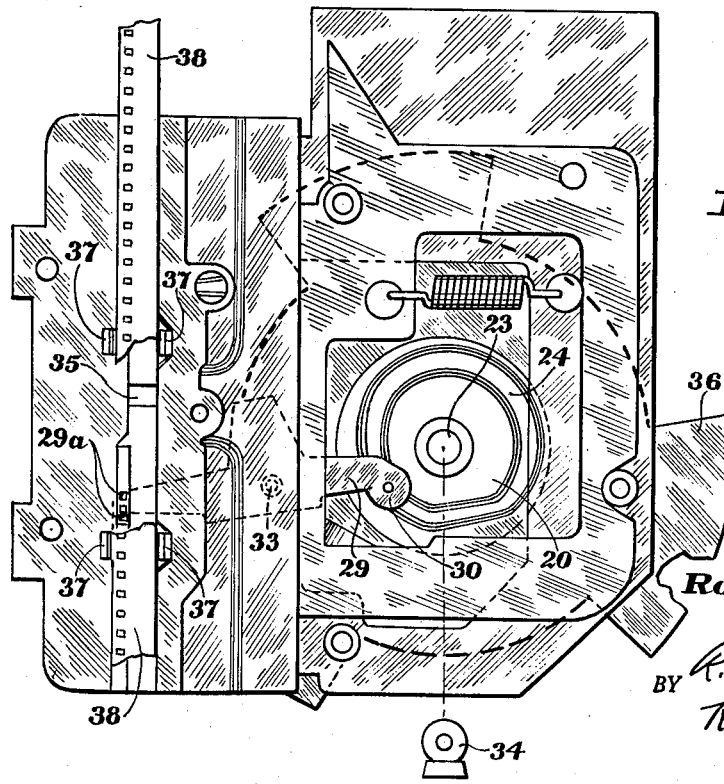
Robert J. Roman
INVENTOR.
BY R. Frank Smith
Robert W. Hampton
ATTORNEYS Nov. 12, 1963
R. J. ROMAN
3,110,194
CAM AND FOLLOWER
Filed Feb. 20, 1962
2 Sheets-Sheet 2
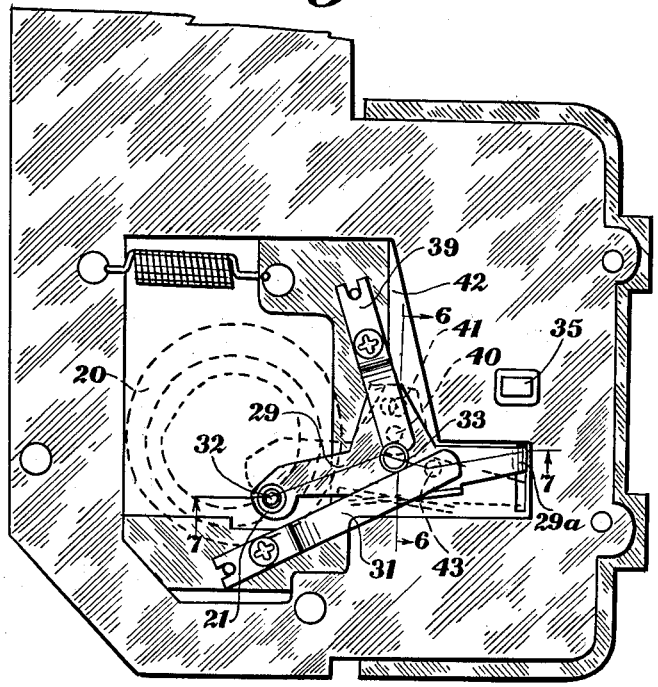
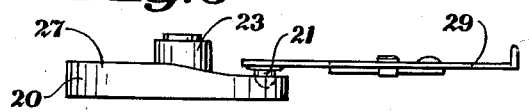
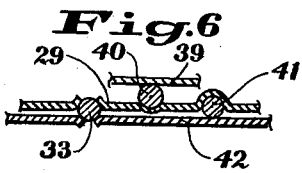
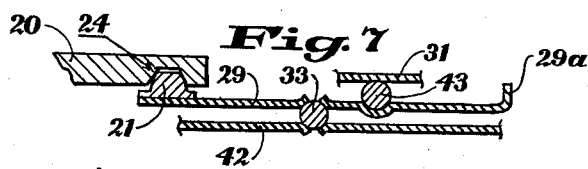
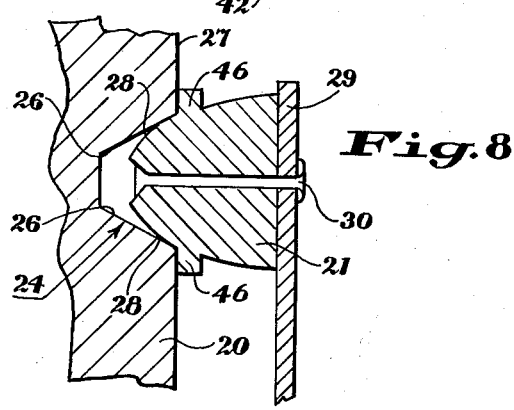
Robert J. Roman
INVENTOR.
BY R. Frank Smith
Robert W. Hampton
ATTORNEYS

United States Patent Office 3,110,194
Patented Nov. 12, 1963

3,110,194
CAM AND FOLLOWER
Robert J. Roman, Rochester, N.Y., assignor to Eastman Kodak Company, Rochester, N.Y., a corporation of New Jersey
Filed Feb. 20, 1962, Ser. No. 174,457
6 Claims. (Cl. 74—567)

This invention relates to a cam and follower, and more particularly, to a cam having a generally V-shaped groove and a follower having a surface engaging the sides of the groove and also having a surface engaging some other surface of the cam so as to minimize the rate of wear of the follower.

The cam and follower, which is the subject of this invention, is disclosed as employed in the pulldown system of a motion picture projector, but the invention is not limited to such a use.

It is well known in the cam-and-follower art to employ a cam having a generally V-shaped groove. One advantage of such a cam groove is that unidirectional spring-loading of a pivoted follower into such a groove, so that the follower engages the sides of the groove, serves to control movement of the follower and to fix its position in all coordinate directions. The spring prevents the follower from leaving the cam groove, and the groove sides fix the follower's position in the plane of the cam. In some projector pulldowns, such V-shaped grooves have been formed in face cams, and from considerations of cost and noise, both the face cam and the follower have been formed of nylon or like material. With such an arrangement, the limiting factor in the performance of the projector was the wearing of the follower. My invention, as employed in projector pulldown systems, has substantially doubled the life of the follower relative to the prior art; in one case the hour rating of a projector was increased from 250 hours to 500 hours by substituting my invention for prior art structure.

According to my invention, a surface of a follower tracking in such a generally V-shaped cam groove is arranged to engage the bottom of the cam groove or some other cam surface to support the follower against the thrust of a resilient means holding the follower in the cam groove, so as to reduce the rate of wear of the follower.

An object of this invention is to extend the life of a follower tracking in a generally V-shaped cam groove.

Other objects of the invention will be more clearly understood from the specification, reference being made to the accompanying drawings, wherein:

FIG. 1 is a cross-section view of a follower in engagement with the sides and bottom of a cam groove.

FIG. 2 is a front view of a cam constructed according to this invention.

FIG. 3 is a left-side view of a cam constructed according to this invention.

FIG. 4 is a front view of a projector pulldown system employing the novel cam and follower.

FIG. 5 is a rear view of a projector pulldown claw arm having a follower constructed according to this invention.

FIGS. 6 and 7 are cross-section views of the projector pulldown claw arm substantially along the FIG. 5 lines, 6—6, and 7—7, respectively.

FIG. 8 is a cross-section of a follower having a flange engaging a face surface of a cam.

Referring to FIG. 1, a cam 20 has a surface formed to define a groove 24. The groove 24 is generally V-shaped and has a closed bottom 25 and two sides 26 opening outward at the top in communication with a cam face 27. The groove sides 26 are non-parallel, but they need not have the same slope with respect to the cam face 27. The groove bottom 25 need not be a flat bottom as illustrated in FIG. 1, but may be curved, or the groove sides 26 may continue to an intersection defining the groove bottom. Also, the groove sides 26 may be curved in the cross-sectional plane, rather than linear as illustrated in FIG. 1.

A follower 21 engages the groove sides 26 at locus 28, and by this engagement, the position of follower 21 is fixed relative to the plane of the cam surface 27.

In FIG. 1, the follower 21 is illustrated as being fastened to a projector pulldown claw arm 29 by means of a rivet 30. A spring 31 (illustrated in FIGS. 5 and 7) holds follower 21 in engagement with groove sides 26. The thrust of the spring 31 is in a direction perpendicular to the plane of the groove bottom 25, so that the spring 31 urges the follower 21 straight into the groove 24.

An extension piece in the form of a tube 32 is fastened in the end of follower 21 so as to engage the groove bottom 25 at locus 32a. Of course, instead of the tube 32, a solid rod or other piece can be used, or an extension can be formed integrally with the follower 21 so as to present a follower surface for engaging groove bottom 25.

The initial length of extension tube 32 is selected so as to leave a small wearing-in clearance, e.g., on the order of .005-inch, between the extension tube 32 and the groove bottom 25 when the follower is in engagement with the groove sides 26. This clearance allows the follower 21 to wear into engagement with the groove sides 26 at the locus 28 before the extension tube 32 engages the groove bottom 25 at the locus 32a, thus enabling the follower 21 to seat itself in the groove 24 without interference from the extension tube 32. As the follower 21 wears into engagement with the cam 20 the wearing-in clearance is reduced until the extension tube 32 engages the groove bottom 25. After this occurs, the extension tube 32 helps support the follower 21 against the thrust of spring 31 so as to reduce the rate of wear of the follower at the locus 28.

The area of the locus of wear 32a of extension tube 32 against groove bottom 25 is chosen as somewhat smaller than the area of wear of follower 21 at the locus 28 after wearing-in of the follower, so that the extension tube 32 wears at a slightly faster rate and thus does not interfere with the engagement of the follower 21 with the cam groove sides 26.

Illustrated in FIG. 8 is a follower embodiment alternative to the extension tube 32. In the alternative embodiment a flange 46 is formed around follower 21 so as to engage cam face 27. The follower 21, which is fastened to pulldown claw arm 29 by a rivet 30, engages cam groove sides 26 at the locus 28. The flange 46 performs a function similar to that of extension tube 32 in that it supports the follower 21 against the thrust of a resilient means (not shown) urging the follower into the groove 24 in cam 20 and provides a follower wearing surface in addition to the surface engaging the groove sides 26. Many follower surfaces, including surfaces in fixed relation to a follower, can be arranged to support a follower tracking in a V-shaped groove so as to minimize the follower wear occurring at the locus of contact with the groove sides.

A face view of the cam 20 is illustrated in FIG. 2. The cam 20 is rotatably driven by a shaft 23. The generally V-shaped groove 24 is eccentric with respect to the shaft 23, and this eccentricity imparts a pivotally reciprocating motion to the pulldown claw arm 29, to which a cam follower is fastened by the rivet 30. Appropriate eccentricity for such a cam groove is well known in the projector pulldown art.

A side view of the cam 20 is illustrated in FIG. 3, where the follower 21, fastened to pulldown claw arm 29, is shown engaging cam 20. The cam groove 24 (not shown) follows the cam surface 27, and transmits appropriate motion to the pulldown claw arm 29 by axial variations in the groove position with respect to shaft 23 during cam rotation. The proper form for such variations in a cam groove are well known in the projector pulldown art.

FIG. 4 shows a motion picture projector pulldown system employing the cam and follower of my invention. Cam 20 with its eccentric groove 24 is rotatably driven by shaft 23 which is driven by a projector motor 34. The pulldown claw arm 29 is pivoted on a ball baring 33. A follower (not shown) is fastened to the cam end of pulldown claw arm 29 by the rivet 30, and a film claw 29a is formed on the other end of pulldown claw arm 29. Coaxially mounted with the cam 20 on shaft 23 is a projector shutter 36 which shutters the projection window 35 past which a film-strip 38 is moved between guides 37.

In FIG. 5, a rear view of the projector pulldown system illustrated in FIG. 4 is shown. The pullodwn claw arm 29 is pivoted on a ball bearing 33, and has formed on one end a film claw 29a and fastened on the other end a cam follower 21 with its extension tube 32. The cam 20 is shown in broken lines. A spring 39 presses against a ball bearing 40 which is seated in a recess in pulldown claw arm 29. A ball bearing 41 seated in another recess on the opposite side of pulldown claw arm 29 is in rolling contact with a plate 42 behind pulldown claw arm 29.

Illustrated in FIG. 6 is a cross-section of pulldown claw arm 29 substantially along the line 6—6 from FIG. 5. The cross-section shows the above-described pulldown claw arm 29, the pivot point ball bearing 33, the plate 42, the ball bearings 40 and 41, and the spring 39. As pulldown claw arm 29 pivots, ball bearing 40 rolls along the under surface of spring 39, and ball bearing 41 rolls along the upper surface of plate 42.

In FIG. 7, another cross-section of pulldown claw arm 29 substantially along the line 7—7 from FIG. 5 is shown. The pulldown claw arm 29 is shown as pivoted on the ball bearing 33 and having on one end a film claw 29a, and fastened on the other end a cam follower 21 in engagement with the cam 20. The spring 31 engages a ball bearing 43 which is set in a recess in pulldown claw arm 29. The thrust from the spring 31 is downward at the point of engagement with ball bearing 43, and this thrust is located with respect to the pivot point ball bearing 33 so that follower 21 is forced upward and directly into cam groove 24 as illustrated in FIG. 7. As pulldown claw arm 29 pivots, the ball bearing 43 rolls along the under surface of spring 31.

The critical function of a reciprocating film claw pulldown system occurs during the film pulldown portion of each cycle, which constitutes approximately 45° of each rotation of cam 20, and during which the pulldown claw arm 29, and the follower 21 are heavily loaded. This load is represented in part by a vector 44 shown in FIG. 1. The vector 44 has a component 45 which tends to force the follower 21 out of the cam groove 24. This force must be overcome by the spring 31 illustrated in FIGS. 5 and 7. When a proper balance of forces is reached between the spring 31 and the component of force 45, these two forces are nearly equal to that the follower 21 tracks in the groove 24 in near equilibrium with respect to the thrust of spring 31 and the force component 45. This insures that the extension tube 32 does not interfere with the tracking of the follower 21 during the critical film pulldown portion of the cam cycle. During the remaining 315° portion of each cycle the force component 45 is smaller, and the spring 31 forces the follower 21 into the cam groove 24 with considerable thrust. In the prior art structures, much of a follower's wear occurred during this remaining portion of the cam cycle when there was very little force, other than the engagement between the cam and follower, to overcome the thrust of a spring holding the follower in a cam groove. Under the present invention, the extension tube 32 bears much of the thrust of the spring 31 during the approximately 315° of each cam cycle not devoted to the film pulldown.

My invention has been disclosed as used in a projector pulldown system, but its usefulness is not limited to such a function. Many cams, including cams other than face cams, have generally V-shaped grooves, and could employ a follower according to my invention. According, although the invention has been described in detail with particular reference to its embodiment in a projector pulldown system, it will be understood that variations and modifications can be effected within the spirit and scope of the invention as described hereinabove and as defined in the appended claims.

I claim:

1. The combination comprising: a cam, a surface of which is formed to define a groove having a generally V-shaped cross-section with a closed bottom, an open top, and two sides; a follower; resilient means applying thrust to said follower for holding the latter in engagement with at least one side of said groove; driving means for providing relative movement between said cam and said follower, and a surface on said follower disposed for engaging a cam surface other than said groove sides for bearing part of the thrust of said resilient means, for minimizing the rate of wear of said follower.

2. The combination comprising: a cam, a surface of which is formed to define a groove having a generally V-shaped cross-section with a closed bottom, an open top, and two sides; a follower; resilient means applying thrust to said follower for holding the latter in engagement with at least one side of said groove; driving means for providing relative movement between said cam and said follower; and a surface on said follower disposed for engaging said groove bottom for bearing part of the thrust of said resilient means, for minimizing the rate of wear of said follower.

3. The combination defined in claim 2, wherein said follower engages both of said groove sides.

4. The combination defined in claim 2, wherein the area of said follower surface engaging said groove bottom is smaller than the total area of said follower surface in engagement with said groove sides.

5. A projector pulldown cam and follower system comprising in combination: a cam, a surface of which is formed to define a groove having a generally V-shaped cross-section with a closed bottom, an open top, and two sides; a pulldown claw arm; a follower arranged for actuating said pulldown claw arm; resilient means for applying thrust to said follower for holding the latter in engagement with said groove sides; driving means for providing relative movement between said cam and said follower; and a surface on said follower disposed for engaging said groove bottom for bearing part of the thrust of said resilient means, for minimizing the rate of wear of said follower.

6. A projector pulldown cam and follower system comprising in combination: a rotatably mounted face cam having an eccentric groove, said groove being generally V-shaped in cross-section with a closed bottom, an open top, and two non-parallel sides farther apart at said groove top than at said groove buttom; a projector motor; means operatively connected with said projector motor for driving said cam in rotational motion; a follower arranged for tracking in said groove by engaging both of said groove sides, said follower being arranged for actuating a pulldown claw arm of said projector; resilient means applying thrust to said follower for holding said follower in engagement with said groove sides; and said follower having a surface in engagement with said groove bottom for bearing part of the thrust of said resilient means for the purpose of reducing the rate of wear of said follower.

References Cited in the file of this patent
UNITED STATES PATENTS

| | | |
|---|---|---|
| 2,521,957 | Wittel et al. | Sept. 12, 1950 |
| 2,660,088 | Serra | Nov. 24, 1953 |
| 3,014,626 | Groves | Dec. 26, 1961 |